(12) United States Patent
Kim et al.

(10) Patent No.: US 11,381,282 B2
(45) Date of Patent: Jul. 5, 2022

(54) APPARATUS AND METHOD FOR PERFORMING BEAMFORMING USING MULTIPLE ANTENNAS IN WIRELESS AV SYSTEM

(71) Applicant: LG ELECTRONICS INC., Seoul (KR)

(72) Inventors: Jinmin Kim, Seoul (KR); Hyowon Bae, Seoul (KR); Jaewook Song, Seoul (KR); Kyuin Lee, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/292,693

(22) PCT Filed: Sep. 10, 2019

(86) PCT No.: PCT/KR2019/011736
§ 371 (c)(1),
(2) Date: May 10, 2021

(87) PCT Pub. No.: WO2020/116747
PCT Pub. Date: Jun. 11, 2020

(65) Prior Publication Data
US 2022/0014239 A1    Jan. 13, 2022

Related U.S. Application Data

(60) Provisional application No. 62/775,907, filed on Dec. 6, 2018.

(51) Int. Cl.
*H04B 7/0413*  (2017.01)
*H04B 7/06*   (2006.01)

(52) U.S. Cl.
CPC ......... *H04B 7/0413* (2013.01); *H04B 7/0617* (2013.01)

(58) Field of Classification Search
CPC .. H04B 7/0413; H04B 7/0617; H04B 7/0695; H04B 7/0408; H04B 7/0491; H04B 7/088; H04L 5/0023
See application file for complete search history.

(56) References Cited

U.S. PATENT DOCUMENTS

2015/0244432 A1\*  8/2015  Wang ................... H04B 7/0695
                                              375/267
2017/0156067 A1\*  6/2017  Huang ............... H01Q 15/0033
(Continued)

FOREIGN PATENT DOCUMENTS

WO       2018082612       5/2018

OTHER PUBLICATIONS

Zhou, et al., "IEEE 802.11ay-Based mmWave WLANs: Design Challenges and Solutions," IEEE Communications Surveys & Tutorials (vol. 20, Issue: 3, pp. 1654-1681) Mar. 2018, 29 pages.
(Continued)

*Primary Examiner* — Vineeta S Panwalkar
(74) *Attorney, Agent, or Firm* — Lee Hong Degerman Kang Waimey

(57) ABSTRACT

The present invention relates to an apparatus and a method for performing beamforming using multiple antennas in a wireless AV system. The present specification discloses a wireless data transmission apparatus comprising: a plurality of transmission antennas; a communication circuit for performing a MIMO beamforming procedure on the basis of an individual transmission sector sweep for each of the plurality of transmission antennas during a data transmission interval within a beacon interval, and transmitting a physical layer protocol data unit (PPDU) frame to a wireless data (Continued)

reception apparatus through the plurality of transmission antennas; and a processor connected to the communication circuit, and configured to generate AV data to be transmitted through the PPDU frame and provide the generated AV data to the communication circuit. The present invention can reduce time required for MIMO beamforming while minimizing training of an excessive sector combination in a communication procedure or information related to the MIMO beamforming in a wireless AV system, and maintain the reliability of the system by using an optimum sector combination.

10 Claims, 14 Drawing Sheets

(56) References Cited

U.S. PATENT DOCUMENTS

| | | |
|---|---|---|
| 2017/0302349 A1 | 10/2017 | Sun et al. |
| 2017/0317727 A1 | 11/2017 | Wang et al. |
| 2018/0279134 A1 | 9/2018 | Malik et al. |
| 2019/0044596 A1* | 2/2019 | Bolotin ................. H04L 5/0055 |
| 2021/0126678 A1* | 4/2021 | Huang ................. H04B 7/0413 |

OTHER PUBLICATIONS

PCT International Application No. PCT/KR2019/0011736, International Search Report dated Dec. 24, 2019, 4 pages.

* cited by examiner (A)

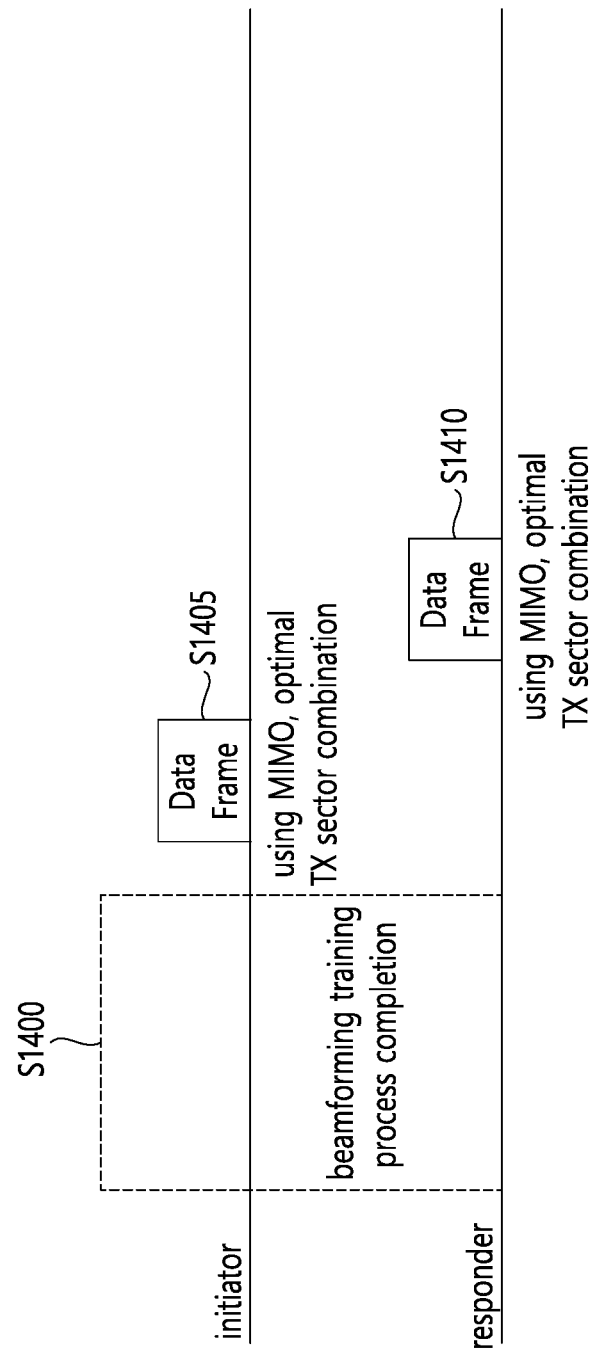

APPARATUS AND METHOD FOR PERFORMING BEAMFORMING USING MULTIPLE ANTENNAS IN WIRELESS AV SYSTEM

CROSS-REFERENCE TO RELATED APPLICATIONS

This application is the National Stage filing under 35 U.S.C. 371 of International Application No. PCT/KR2019/011736, filed on Sep. 10, 2019, which claims the benefit of U.S. Provisional Application No. 62/775,907, filed on Dec. 6, 2018, the contents of which are all incorporated by reference herein in their entirety.

BACKGROUND

Field of the Disclosure

The present disclosure relates to a wireless audio/video (AV) system, and more particularly, to an apparatus and method for performing beamforming using multiple antennas in the wireless AV system.

Related Art

Recently, there is a growing demand for high-resolution and high-quality pictures such as a high definition (HD) picture and an ultra-high definition (UHD) picture in various fields. The higher the resolution and quality of picture data, the greater the amount of information of bits to be transmitted relative to the existing picture data. Therefore, transmission cost may increase when the picture data is transmitted using a medium such as the existing wired/wireless broadband line.

Meanwhile, the institute of electrical and electronics engineers (IEEE) 802.11ad standard is a high-speed wireless communication standard which operates in a band of at least 60 GHz. A signal reachable range is about 10 meters, but a throughput of at least 6 Gbps may be supported. The IEEE 802.11ad standard provides a beamforming training process for antenna beam alignment. IEEE 802.11ay is a next-generation standard which is under development for the purpose of a throughput of at least 20 Gbps based on the IEEE 802.11ad.

Multiple access and communication between a plurality of unspecified devices are premised in case of the existing standard such as a series of IEEE 802.11ad or ay. Therefore, a data format or frame format used by a medium access control (MAC) layer or physical layer of the series of IEEE 802.11ad or ay includes a plurality of control information fields for controlling and managing resources and operations of a plurality of devices. However, in an application of a wireless AV system to which the present disclosure belongs, wireless communication in a situation where peer devices are specified is premised in most cases (e.g., communication between a wireless set-top box and a wireless TV).

A data transmitting device and/or data receiving device in a multiple input multiple output (MIMO)-based wireless AV system may perform MIMO beamforming using multiple antennas. However, when the MIMO beamforming is performed according to a sweep for all possible combinations per antenna and sector, it may take a considerable amount of time for the MIMO beamforming. In a specific environment where peer devices are potentially fixed similarly to the wireless AV system, the MIMO beamforming scheme may not meet a requirement of the wireless AV system pursuing low latency and high reliability, and may operate without problems even if some procedures are omitted, reduced, or changed. Accordingly, there is a need for an apparatus and method capable of reducing a time required for MIMO beamforming while maintaining reliability of the MIMO beamforming.

SUMMARY

The present disclosure provides an apparatus and method for performing beamforming using multiple antennas in a wireless audio/video (AV) system.

The present disclosure also provides an apparatus and method for performing transmit (Tx) sector training for multiple input multiple output (MIMO) beamforming through a simplified method in a wireless AV system.

The present disclosure also provides an apparatus and method for performing receive (Rx) sector training for MIMO beamforming in a wireless AV system.

According to an aspect of the present disclosure, there is provided a wireless data transmitting device in a wireless AV system. The device includes a plurality of transmit antennas, a communication circuit which performs a MIMO beamforming procedure based on an individual Tx sector sweep for each of the plurality of transmit antennas during a data transmission interval (DTI) within a beacon interval (BI), and transmits a physical layer protocol data unit (PPDU) frame to a wireless data receiving device through the plurality of transmit antennas, and a processor coupled with the communication circuit and configured to generate AV data to be transmitted through the PPDU frame and provide the AV data to the communication circuit.

In an aspect, the individual Tx sector sweep may include sweeping performed by each of the plurality of transmit antennas for a new sector while changing a sector sequentially every sweep unit.

In another aspect, the wireless data receiving device may operate in a quasi-omni antenna mode during the MIMO beamforming procedure is performed.

In another aspect, the MIMO beamforming procedure may include an individual Rx sector sweep for each of a plurality of receive antennas included in the wireless data receiving device.

In another aspect, the plurality of transmit antennas may operate in a quasi-omni antenna mode during the individual Rx sector sweep is performed.

In another aspect, the communication circuit may derive K candidate Tx sectors for each of the transmit antennas as a result of the individual Tx sensor sweep, and derive J candidate Rx sectors for each of the receive antennas as a result of the individual Rx sector sweep.

In another aspect, the MIMO beamforming procedure may further include a single user (SU)-MIMO procedure. The SU-MIMO procedure may determine an optimal Tx-Rx sector combination from the K candidate Tx sectors and the J candidate Rx sectors.

In another aspect, the communication circuit may transmit the PPDU frame, based on the optimal Tx-Rx sector combination determined according to the MIMO beamforming procedure.

According to another aspect of the present disclosure, there is provided a wireless data receiving device in a wireless AV system. The device includes a plurality of receive antennas, a communication circuit which performs a MIMO beamforming procedure based on an individual Rx sector sweep for each of the plurality of receive antennas during a DTI within a BI, and receives a PPDU frame from a wireless data transmitting device through the plurality of receive antennas, and a processor coupled with the communication circuit and configured to restore AV data included in the PPDU frame.

In an aspect, the individual Rx sector sweep may include sweeping performed by each of the plurality of receive antennas for a new sector while changing a sector sequentially every sweep unit.

In another aspect, the wireless data transmitting device may operate in a quasi-omni antenna mode during the MIMO beamforming procedure is performed.

In another aspect, the MIMO beamforming procedure may include an individual Tx sector sweep for each of a plurality of transmit antennas included in the wireless data transmitting device.

In another aspect, the plurality of receive antennas may operate in a quasi-onmi antenna mode during the individual Tx sector sweep is performed.

In another aspect, the communication circuit may derive J candidate Rx sectors for each of the receive antennas as a result of the individual Rx sensor sweep, and derive K candidate Tx sectors for each of the transmit antennas as a result of the individual Tx sector sweep.

In another aspect, the MIMO beamforming procedure may further include a SU-MIMO procedure. The SU-MIMO procedure may determine an optimal Tx-Rx sector combination from the K candidate Tx sectors and the J candidate Rx sectors.

In another aspect, the communication circuit may receive the PPDU frame, based on the optimal Tx-Rx sector combination determined according to the MIMO beamforming procedure.

The present disclosure can reduce a time required for MIMO beamforming while minimizing training of an excessive sector combination in a communication procedure or information related to MIMO beamforming in a wireless AV system, and can maintain reliability of the system by using an optimum sector combination.

BRIEF DESCRIPTION OF THE DRAWINGS

FIG. 6 shows a beamforming training process according to an embodiment.

FIG. 14 shows a data communication method based on a beamforming training process according to an embodiment.

DESCRIPTION OF EXEMPLARY EMBODIMENTS

Hereinafter, embodiments of a wireless data transmitting device and method and a wireless data receiving device and method are described in detail according to the present disclosure, but the present disclosure is not limited thereto. Features of the present disclosure are described by the illustrated embodiments. However, functions and structures identical or equivalent to the embodiments described in the present specification are included within the spirit and scope of the present disclosure, and may also be achieved by other intended embodiments. Throughout the present specification, like reference numbers indicate like parts or features. Hereinafter, embodiments of the present disclosure will be described in detail with reference to the accompanying drawings.

Recently, a design of a display device such as a TV is becoming more important, and a display panel is gradually becoming thinner with the development of a display panel technology such as OLED. However, there is a limitation in producing and designing a thinner display panel due to a basic thickness of a driving circuit which drives the display panel. Therefore, there is a growing attention for a technique in which the remaining components other than inevitable components to be physically and electrically coupled with the display panel are separated from the display panel and provided in a separate device (hereinafter, referred to as a mainframe device). In this case, the mainframe device and the display device may be configured to mutually exchange a video signal and an audio signal, based on wireless communication. The present disclosure relates to a wireless AV system or wireless display system of which a mainframe device and a display device are physically and/or electrically independent as described above and which mutually reproduces media, based on wireless communication.

Figure 1:
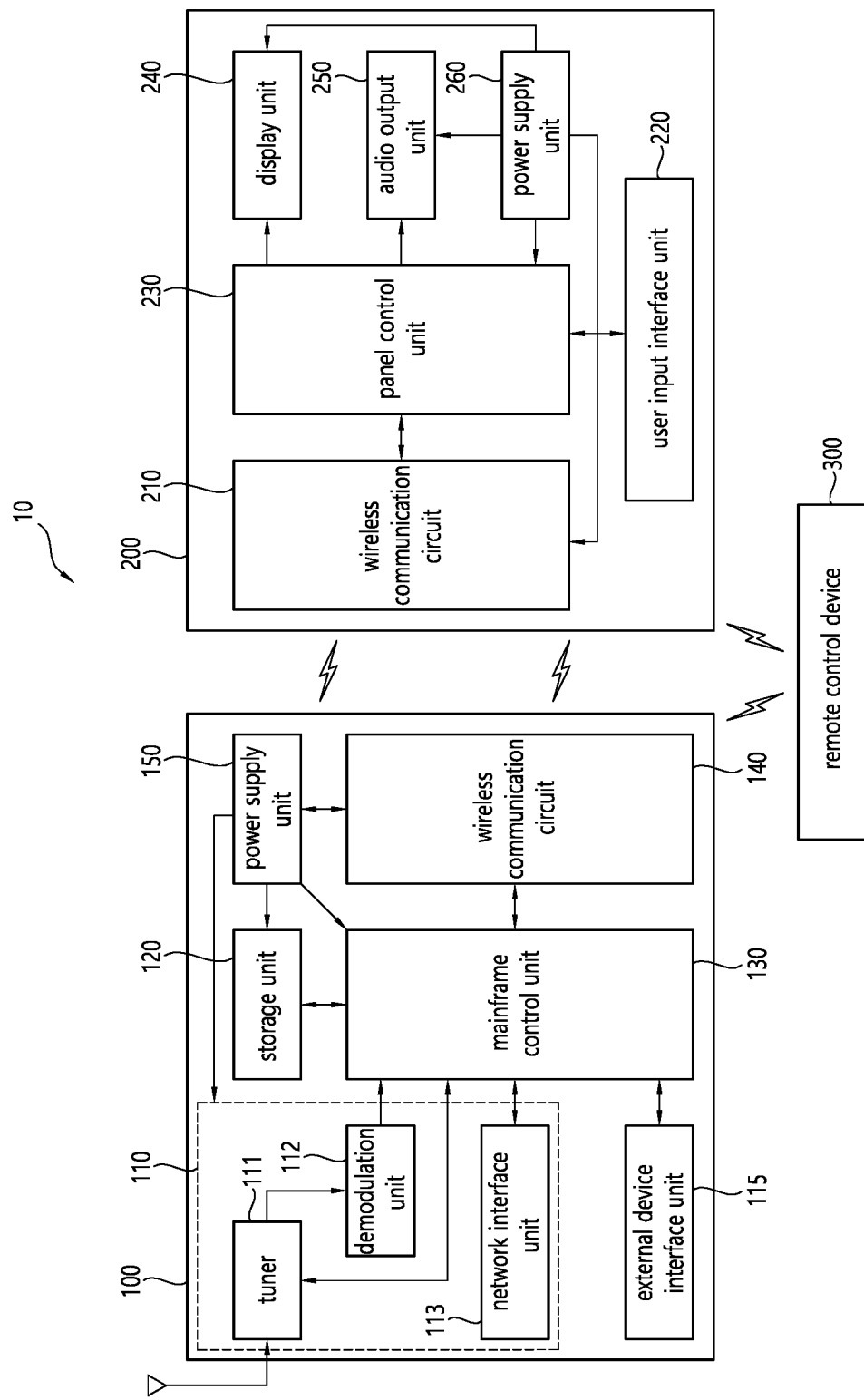
FIG. 1 is a block diagram of a wireless display system according to an embodiment.

FIG. 1 is a block diagram of a wireless AV system according to an embodiment.

Referring to FIG. 1, a wireless AV system 10 may include a mainframe device 100, a display device 200, and a remote control device 300.

The mainframe device 100 may perform an operation of receiving a wired/wireless-type external signal related to audios, videos, pictures, images, multimedia, or at least one combination thereof, generating a data stream or bit stream by processing the received external signal in various manners, and transmitting it to the display device 200 through a wireless interface.

In order to perform such an operation, the mainframe device 100 may include an external signal receiving unit 110, an external device interface unit 115, a storage unit 120, a mainframe control unit 130, a wireless communication circuit 140, and a power supply unit 150.

The external signal receiving unit 110 may include a tuner 111, a demodulation unit 112, and a network interface unit 113.

The tuner 111 receives a wired/wireless-type external signal related to audios, videos, pictures, images, multimedia, or at least one combination thereof. For example, the tuner 111 may select a specific broadcast channel according to a channel selection command and receive a broadcast signal for the selected specific broadcast channel.

The demodulation unit 112 may separate the received external signal into a video signal, an image signal, a picture signal, an audio signal, a data signal related to a broadcast program, or the like, and may restore the separated video signal, image signal, picture signal, audio signal, data signal related to the broadcast program, or the like into a format which can be output.

The external device interface unit 115 may receive an application or an application list in an adjacent external device and transmit it to the mainframe control unit 130 or the storage unit 120.

The external device interface unit 115 may provide a connection path between the mainframe device 100 and the external device. The external device interface unit 115 may receive one or more of audios, videos, pictures, images, multimedia, and at least one combination thereof output from the external device coupled in a wireless or wired manner to the mainframe device 100, and may transfer it to the mainframe control unit 130. The external device interface unit 115 may include a plurality of external input terminals. The plurality of external input terminals may include an RGB terminal, one or more high definition multimedia interface (HDMI) terminals, and a component terminal.

The external device that can be coupled with the external device interface unit 115 may be any one of a set-top box, a Blu-ray player, a DVD player, a game device, a sound bar, a smartphone, a PC, a USB memory, and a home theater, but this is for exemplary purposes only.

The network interface unit 113 may provide an interface for coupling the mainframe device 100 to a wired/wireless network including an Internet network. The network interface unit 113 may transmit or receive data with another user or another electronic device through an accessed network or another network linked to the accessed network.

In addition, part of content data stored in the mainframe device 100 may be transmitted to a selected user or a selected electronic device among the pre-stored other users or other electronic devices.

The network interface unit 113 may access a predetermined webpage through the accessed network or another network linked to the accessed network. That is, data can be transmitted or received with a corresponding server by accessing the predetermined webpage through the network.

In addition, the network interface unit 113 may receive content or data provided by a content provider or a network operator. That is, the network interface unit 113 may receive content such as movies, advertisements, games, VODs, broadcast signals, or the like provided from the content provider or the network operator through the network, and information related to the content.

In addition, the network interface unit 113 may receive update information and update files of firmware provided by the network operator, and may transmit data to the Internet or content provider or the network operator.

The network interface unit 113 may select and receive a desired application among applications open to the public through the network.

The storage unit 120 may store a program for processing and controlling each signal in the mainframe control unit 130, and may store signal-processed video, audio, or data signals.

In addition, the storage unit 120 may perform a function for temporarily storing a picture, audio, or data signal input from the external device interface unit 115 or the network interface unit 113, and may store information related to a predetermined image through a channel memory function.

The storage unit 120 may store an application or an application list input from the external device interface unit 115 or the network interface unit 113.

The mainframe control unit 130 may control the mainframe device 100 by a user command or internal program input through the remote control device 300, and may access the network to download an application desired by a user or an application list into the mainframe device 100.

The mainframe control unit 130 may allow channel information or the like selected by the user to be output through the display device 200 or an audio output unit 250 together with the processed picture or audio signal.

In addition, the mainframe control unit 130 may allow a picture signal or an audio signal, provided from an external device, for example, a camera or a camcorder, input through the external device interface unit 115, to be output through the display device 200 or the audio output unit 250, according to an external device picture playback command received through the remote control device 300.

In addition, the mainframe control unit 130 may provide control to reproduce content stored in the storage unit 120, broadcast content received, and external input content which is input from the outside. The content may have various formats such as a broadcast picture, an external input picture, an audio file, a still picture, an accessed web screen, a text file, or the like.

The mainframe control unit 130 may perform an operation of decoding data or the like related to a video, image, picture, audio, and broadcast program input through the demodulation unit 112, the external device interface unit 115, or the storage unit 120, encoding again the decoded data in accordance with an encoding/decoding scheme supported by the display device 200, generating a data stream or a bit stream by processing data through various picture/audio processing schemes such as compression or encoding so that the encoded data is transmitted through a wireless channel, and transmitting the generated data stream or bit stream to the display device 200 through the wireless communication circuit 140. According to an embodiment, the mainframe control unit 130 may transmit the decoded data again to the display device 200 directly through the wireless communication circuit 140 by bypassing the decoded data without having to encode it in accordance with the encoding/decoding scheme supported by the display device 200.

In addition, the mainframe control unit 130 may be configured to implement functions, procedures, and/or methods of a processor 1130 of a wireless data transmitting device 1100 described in each embodiment of the present specification. Layers of a wireless interface protocol may be implemented in the processor 1130.

The wireless communication circuit 140 is operatively coupled with the mainframe control unit 130 to receive a data stream or a bit stream from the mainframe control unit 130, generates a wireless stream by encoding and/or modulating the data stream or the bit stream so that it can be transmitted through a wireless channel, and transmits the wireless stream to the display device 200. The wireless communication circuit 140 establishes a wireless link, and the mainframe device 100 and the display device 200 are coupled by means of the wireless link. The wireless communication circuit 140 may be implemented based on various wireless communication schemes, for example, short-range wireless communication such as WI-FI, Bluetooth, NFC, and RFID, or a mobile communication network (e.g., 3G, 4G, 5G cellular network, etc.). For example, the wireless communication circuit 140 may perform communication using a communication protocol such as the IEEE 802.11 series standard.

The power supply unit 150 supplies power to the external signal receiving unit 110, the external device interface unit 115, the storage unit 120, the mainframe control unit 130, and the wireless communication circuit 140. A scheme in which the power supply unit 150 receives power from the outside may include a terminal scheme and a wireless scheme. When the power supply unit 150 receives power in a wireless manner, the power supply unit 150 may include a separate component for wirelessly receiving power. For example, the power supply unit 150 may include a power pick-up unit configured to receive wireless power by magnetic coupling with an external wireless power transmitting device, and a separate communication and control unit configured to perform communication with the wireless power transmitting device and control transmission and reception of wireless power.

The wireless communication circuit 140 may also be wirelessly coupled with the remote control device 300 to transfer a signal input by the user to the mainframe control unit 130 or transfer a signal from the mainframe control unit 130 to the user. For example, according to various communication schemes such as Bluetooth, ultra wideband (WB), Zigbee, a radio frequency (RF) communication scheme, or an infra-red (IR) communication scheme, the wireless communication circuit 140 may receive from the remote control device 300 a control signal such as power on/off, screen setting, or the like of the mainframe device 100, or may transmit the control signal from the mainframe control unit 130 to the remote control device 300.

In addition, the wireless communication circuit 140 may transfer to the mainframe control unit 130 a control signal input from a local key (not shown) such as a power key, a volume key, a set value, or the like.

Next, the display device 200 may perform a display or audio output operation after processing a wireless stream received from the mainframe device 100 through a wireless interface according to a reverse process of signal processing performed by the mainframe device 100. In order to perform such an operation, the display device 200 may include a wireless communication circuit 210, a user input interface unit 220, a panel control unit 230, a display unit 240, an audio output unit 250, and a power supply unit 260.

The wireless communication circuit 210 is coupled with the wireless communication circuit 140 of the mainframe device 100 through a wireless link to perform wireless communication with the wireless communication circuit 130 of the mainframe device 100. Specifically, the wireless communication circuit 210 receives a wireless stream from the wireless communication circuit 140 of the mainframe device 100, demodulates the wireless stream, and transmits the demodulated wireless stream to the panel controller 230. The wireless communication circuit 210 may be implemented based on various wireless communication schemes, for example, short-range wireless communication such as WI-FI, Bluetooth, NFC, and RFID, or a mobile communication network (e.g., 3G, 4G, 5G cellular network, etc.). For example, the wireless communication circuit 210 may perform communication using a communication protocol such as the IEEE 802.11 series standard, e.g., IEEE 802.11ay.

The panel control unit 230 decodes a signal demodulated by the wireless communication circuit 210 to restore a bit stream or a data stream. In this case, when the bit stream or data stream is compressed, the panel controller 230 performs an operation of decompressing or restoring the bit stream or data stream, and then outputs signals such as a video signal, an image signal, a picture signal, an audio signal, and a data signal related to a broadcast program. The signals may be sent to the display unit 240, the audio output unit 250, and the user input interface unit 220.

The video signal, the picture signal, the image signal, or the like may be input to the display unit 240 and may be displayed as a picture corresponding to the picture signal. In addition, a picture signal processed by the panel control unit 230 may be transmitted again to the mainframe device 100 through the wireless communication circuit 210, and may be input to an external output device through the external device interface unit 115 of the mainframe device 100.

An audio signal processed by the panel controller 230 may be output to the audio output unit 250. In addition, the audio signal processed by the panel control unit 230 may be transmitted again to the mainframe device 100 through the wireless communication circuit 210, and may be input to the external output device through the external device interface unit 115 of the mainframe device 100.

Meanwhile, the panel control unit 230 may control the display unit 240 to display a picture, for example, may provide control such that a broadcast picture input through the tuner 111, an external input picture input through the external device interface unit 115, a picture input through the network interface unit, or a picture stored in the storage unit 120 is displayed on the display unit 240. In this case, the picture displayed on the display unit 240 may be a still picture or a moving picture, and may be a 2D picture or a 3D picture.

The panel controller 230 may be configured to implement functions, procedures, and/or methods of a processor 1230 of a wireless data receiving device 1200 described in each embodiment of the present specification. In addition, the processor 1230 may be configured to implement functions, procedures, and/or methods of the wireless data receiving device 1200 described in each embodiment of the present specification.

The user input interface 220 may transfer a signal input by the user to the panel control unit 230 or transfer a signal from the panel control unit 230 to the user. For example, according to various communication schemes such as Bluetooth, ultra wideband (WB), Zigbee, a radio frequency (RF) communication scheme, or an infra-red (IR) communication scheme, the user input interface unit 220 may receive from the remote control device 300 a control signal such as power on/off, screen setting, or the like of the display device 200, or may transmit the control signal from the panel control unit 230 to the remote control device 300.

In addition, the user input interface unit 220 may transfer to the panel control unit 230 a control signal input from a local key (not shown) such as a power key, a volume key, a set value, or the like.

The power supply unit 150 supplies power to the wireless communication circuit 210, the user unit interface unit 220, the panel control unit 230, the display unit 240, and the audio output unit 250. A scheme in which the power supply unit 260 receives power from the outside may include a terminal scheme and a wireless scheme. When the power supply unit 260 receives power in a wireless manner, the power supply unit 260 may include a separate component for wirelessly receiving power. For example, the power supply unit 260 may include a power pick-up unit configured to receive wireless power by magnetic coupling with an external wireless power transmitting device, and a separate communication and control unit configured to perform communication with the wireless power transmitting device and control transmission and reception of wireless power.

The remote control device 300 performs an operation in which the mainframe device 100 and/or the display device 200 remotely control power on/off, channel selection, screen setting, or the like, and may be referred to as a remote controller.

Meanwhile, since the mainframe device 100 and display device 200 of FIG. 1 are only one embodiment of the present specification, some of components illustrated herein may be integrated, added, or omitted according to specifications of the mainframe device 100 and display device 200 actually implemented. That is, if necessary, two or more components may be combined into one component, or one component may be subdivided into two or more components. In addition, a function performed in each block is for explaining the embodiments of the present disclosure, and a specific operation or device does not limit the scope of the present disclosure.

According to another embodiment of the present disclosure, unlike in FIG. 1, the mainframe device 100 does not include the tuner 111 and the demodulation unit 112, and may receive a picture through the network interface unit 113 or the external device interface unit 115 to reproduce the picture.

For example, the mainframe device 100 may be implemented by being divided into a picture processing device such as a set-top box or the like for receiving a broadcast signal or content according to various network services and a content reproducing device for reproducing content input from the picture processing device.

In this case, a method of operating the wireless AV system 10 according to an embodiment of the present disclosure to be described below may be performed by not only the mainframe device 100 and the display device 200 as described with reference to FIG. 1 but also any one of a picture processing device such as the separate set-top box or the like and a content reproducing device having the audio output unit 250.

In terms of system input/output, the mainframe device 100 may be referred to as a wireless source device which provides a source wirelessly, and the display device 200 may be referred to as a wireless sink device which receives the source wirelessly. The wireless source device and the wireless sink device may implement wireless display (WD) communication techniques compatible with standards such as wireless HD, wireless home digital interface (WHDI), WiGig, wireless USB, and Wi-Fi display (WFD) (also known as Miracast).

In terms of an application, the mainframe device 100 may be integrated in a form of constituting part of a wireless set-top box, a wireless gaming console, a wireless digital video disk (DVD) player, and a wireless writer. In this case, the mainframe device 100 may be provided in a form of a wireless communication module or chip. In addition, the display device 200 may be integrated in a form of constituting part of a user device or electronic device (e.g., a wireless TV, a wireless monitor, a wireless projector, a wireless printer, a wireless vehicle dashboard display, a wearable device, an augmented reality (AR) headset, a virtual reality (VR) headset, etc.) having a display panel for displaying an image or a video. In this case, the display device 200 may be provided in a form of a wireless communication module or chip.

The mainframe device 100 and the display device 200 may be integrated in a form of constituting part of a mobile device. For example, the mainframe device 100 and the display device 200 may be integrated into a mobile terminal including smartphones, smart pads, or tablets, or other types of wireless communication devices, portable computers having wireless communication cards, a personal digital assistant (PDA), a portable media player, a digital image capturing device such as a camera or a camcorder, or other flash memory devices having wireless communication capabilities. In this case, the mainframe device 100 and the display device 200 may be provided in a form of a wireless communication module or chip.

A smartphone user may stream or mirror a video or audio output by a user's smartphone, tablet, or other computer devices to another device such as a television or projector capable of providing a higher resolution display or other enhanced user experiences.

As described above, the mainframe device 100 may perform an operation of receiving a wired/wireless-type external signal related to audios, videos, pictures, images, multimedia, or at least one combination thereof, generating a data stream or bit stream by processing the received external signal in various manners, and transmitting it to the display device 200 through a wireless interface.

Hereinafter, the picture/video/audio data transmitted through the wireless interface is collectively referred to as wireless data. That is, the mainframe device 100 may communicate wirelessly with the display device 200 and transmit wireless data. Therefore, in terms of a wireless data transceiving system 1000, the mainframe device 100 may be referred to as the wireless data transmitting device 1100, and the display device 200 may be referred to as the wireless data receiving device 1200. Hereinafter, the present disclosure will be described in greater detail in terms of the wireless data transceiving system 1000. First, a detailed block diagram of the wireless data transceiving system 1000 is disclosed.

Figure 2:
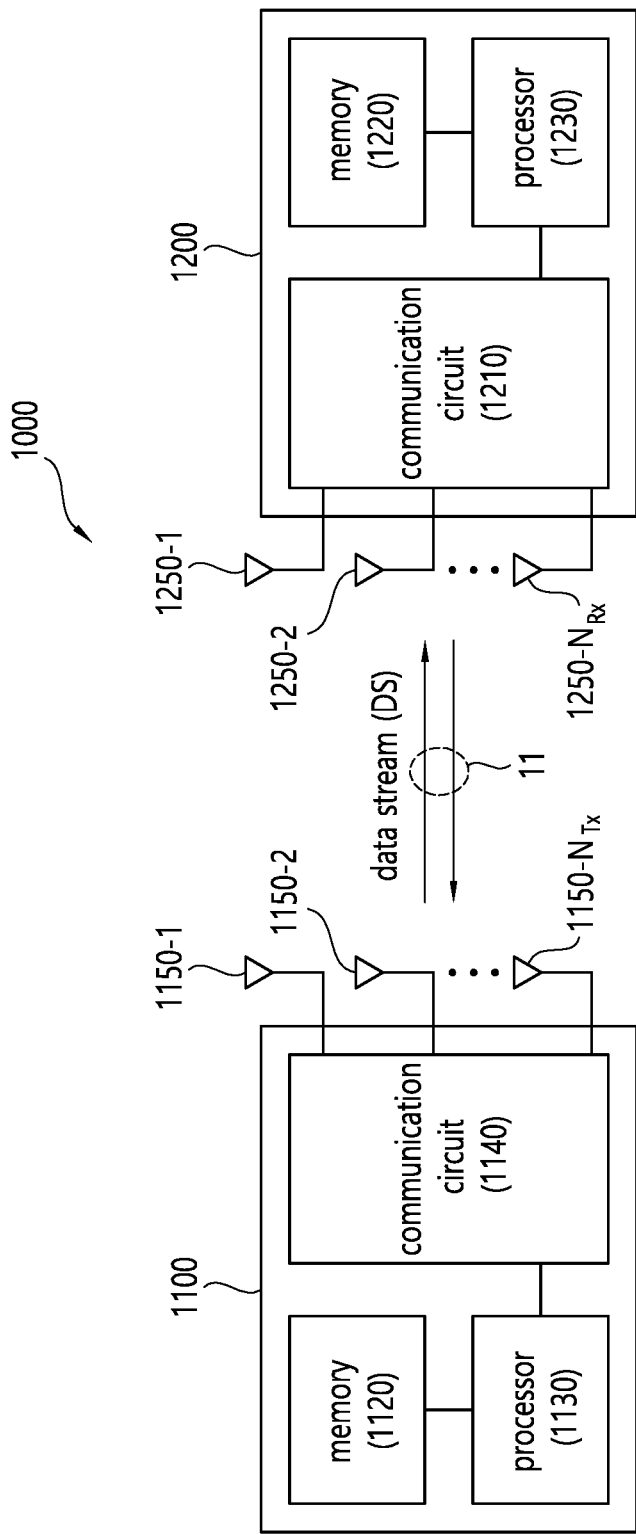
FIG. 2 is a block diagram of a wireless data transceiving system according to an embodiment.

FIG. 2 is a block diagram of a wireless data transceiving system according to an embodiment.

Referring to FIG. 2, the wireless data transceiving system 1000 refers to a system for transmitting and receiving a data stream wirelessly, and includes the wireless data transmitting device 1100 and at least one wireless data receiving device 1200. The wireless data transmitting device 1100 is communicatively coupled with the at least one wireless data receiving device 1200.

In terms of a wireless communication system (i.e., WLAN, WiFi), the wireless data transmitting device 1100 may be referred to as an AP or a personal basic service set control point (PCP) station, and the wireless data receiving device 1200 may be referred to as an STA or a non-PCP station.

In terms of input/output of a data stream, the wireless data transmitting device 1100 may be referred to as a wireless source device which provides a source wirelessly, and the wireless data receiving device 1200 may be referred to as a wireless sink device which receives the source wirelessly. The wireless source device and the wireless sink device may implement wireless display (WD) communication techniques compatible with standards such as wireless HD, wireless home digital interface (WHDI), WiGig, wireless USB, and Wi-Fi Display (WFD) (also known as Miracast).

In terms of an application, the wireless data transmitting device 1100 may be integrated in a form of constituting part of a wireless set-top box, a wireless gaming console, a wireless digital video disk (DVD) player, and a wireless writer. In this case, the wireless data transmitting device 1100 may be provided in a form of a wireless communication module or chip. In addition, the wireless data receiving device 1200 may be integrated in a form of constituting part of a user device or electronic device (e.g., a wireless TV, a wireless monitor, a wireless projector, a wireless printer, a wireless vehicle dashboard display, a wearable device, an augmented reality (AR) headset, a virtual reality (VR) headset, etc.) having a display panel for displaying an image or a video. In this case, the wireless data receiving device 1200 may be provided in a form of a wireless communication module or chip.

The wireless data transmitting device 1100 and the wireless data receiving device 1200 may be integrated in a form of constituting part of a mobile device. For example, the wireless data transmitting device 1100 and the wireless data receiving device 1200 may be integrated into a mobile terminal including smartphones, smart pads, or tablets, or other types of wireless communication devices, portable computers having wireless communication cards, a personal digital assistant (PDA), a portable media player, a digital image capturing device such as a camera or a camcorder, or other flash memory devices having wireless communication capabilities. In this case, the wireless data transmitting device 1100 and the wireless data receiving device 1200 may be provided in a form of a wireless communication module or chip.

A smartphone user may stream or mirror a video or audio output by a user's smartphone, tablet, or other computer devices to another device such as a television or projector capable of providing a higher resolution display or other enhanced user experiences.

In an aspect, data may include audios, videos, pictures, images, and multimedia, or may be constructed of at least one combination thereof.

In another aspect, the data may include a bit stream of an audio-compressed format, a bit stream of a video-compressed format, a bit stream of a picture-compressed format, and a bit stream of a multimedia-compressed format, or may include at least one combination thereof. In this case, the wireless data transceiving system 1000 may also be referred to as a wireless compressed data stream transceiving system. In addition, the wireless compressed data stream transceiving system 1000 may further include a functional or physical unit for compressing data.

Regarding a detailed structure of each device, the wireless data transmitting device 1100 includes a memory 1120, a processor 1130, a communication circuit 1140, and a plurality of antennas 1150-1, 1150-2, . . . , 1150-$N_{Tx}$, and the wireless data receiving device 1200 includes a communication circuit 1210, a memory 1220, a processor 1230, and a plurality of antennas 1250-1, 1250-2, . . . , 1250-$N_{Rx}$.

The memories 1120 and 1220 are operatively coupled to the processors 1130 and 1230, and store a variety of information for operating the processors 1130 and 1230. The memories 1120 and 1220 may include a read-only memory (ROM), a random access memory (RAM), a flash memory, a memory card, a storage medium, and/or other equivalent storage devices.

The processor 1130 may be configured to implement functions, procedures, and/or methods of the wireless data transmitting device 1100 described in each embodiment of the present specification. In addition, the processor 1230 may be configured to implement functions, procedures, and/or methods of the wireless data receiving device 1200 described in each embodiment of the present specification. Layers of the wireless interface protocol may be implemented in the processors 1130 and 1230.

In terms of the display system of FIG. 1, the processor 1130 may be configured to perform a function of the mainframe control unit 130. For example, the processor 1130 may perform an operation of decoding data or the like related to a video, image, picture, audio, and broadcast program input through the demodulation unit 112, the external device interface unit 115, or the storage unit 120, generating a data stream or a bit stream by processing data through various picture/audio processing schemes such as compression or encoding so that the decoded data is transmitted through a wireless channel, and transmitting the generated data stream or bit stream to the display device 200 through the communication circuit 1140.

The processors 1130 and 1230 may include application-specific integrated circuits (ASICs), other chipsets, logic circuits, and/or data processors.

When the embodiment is implemented in software, the techniques explained in the present specification may be implemented with a module (i.e., procedure, function, etc.) for performing the functions explained in the present specification. The module may be stored in the memories 1120 and 1220 and may be performed by the processors 1130 and 2310. The memories 1120 and 1220 may be implemented inside the processors 1130 and 2310. Alternatively, the memories 1120 and 1220 may be implemented outside the processor 2310, and may be coupled to the processors 1130 and 1230 in a communicable manner by using various well-known means.

The communication circuits 1140 and 1210 may include a baseband circuit for processing a radio frequency signal. The communication circuits 1140 and 1210 are operatively coupled to the processors 1130 and 1230, and transmit and/or receive data wirelessly. A communication channel constituted by the communication circuits 1140 and 1210 may be a network communication channel. In this case, the communication circuits 1140 and 1210 may establish a tunneled direct link setup (TDLS) which is tunneled to avoid or reduce network congestion. The Wi-Fi direct and the TDLS are used to set up relatively short-range communication sessions. A communication channel constituting a radio link 11 may be a communication channel of a relatively short range, or may be a communication channel implemented using a physical channel structure such as Wi-Fi, Bluetooth, or the like which uses various frequencies such as 2.4 GHz, 3.6 GHz, 5 GHz, 60 GHz, or ultra wide band (UWB).

Although techniques disclosed in the present specification may be primarily described in association with a communication protocol such as an IEEE 802.11 series standard, aspects of these techniques may also be compatible with other communication protocols. For example, the communication circuits 1140 and 1210 may be implemented based on various wireless communication schemes, such as short-range wireless communication, e.g., WI-FI, Bluetooth, NFC, and RFID, or a mobile communication network (e.g., 3G, 4G, 5G cellular network, etc.), or may perform communication by using a communication protocol such as the IEEE 802.11 series standard. By way of example and without limitation, wireless communication between the communication circuits 1140 and 1210 may use orthogonal frequency division multiplexing (OFDM) techniques. It is also possible to use various other wireless communication techniques including, but not limited to, time division multiple access (TDMA), frequency division multiple access (FDMA), code division multiple access (CDMA), or any combination of OFDM, FDMA, TDMA and/or CDMA.

Figure 3:
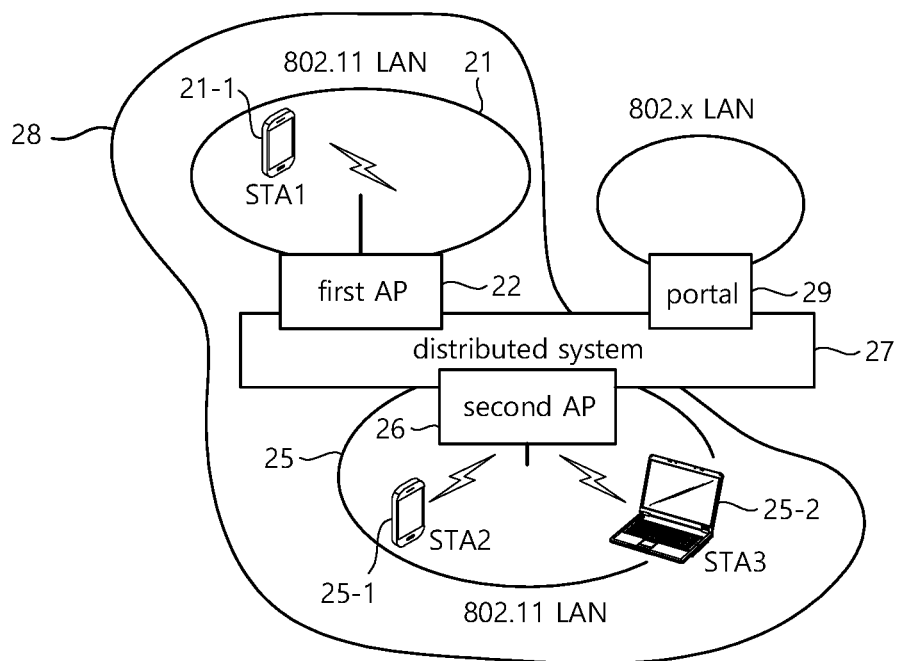
FIG. 3 is a conceptual diagram illustrating a case where a wireless data transceiving system is implemented with an IEEE 802.11 series communication protocol according to an embodiment.
Figure 3:
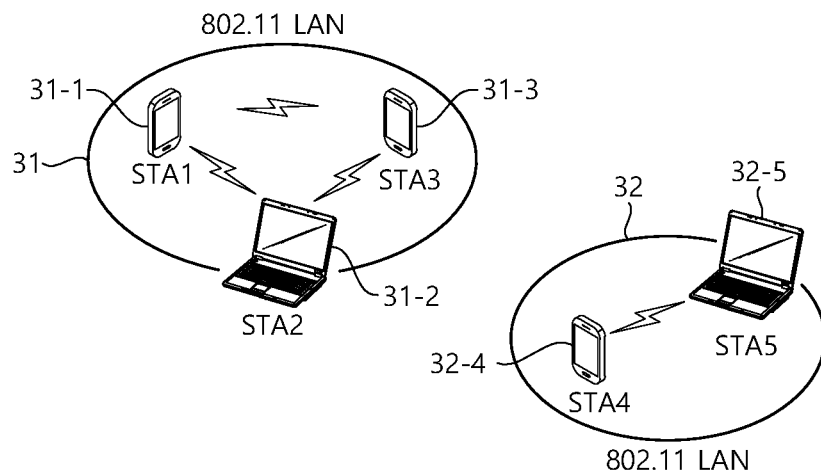

FIG. 3 is a conceptual diagram illustrating a case where a wireless data transceiving system is implemented with an IEEE 802.11 series communication protocol according to an embodiment.

Referring to FIG. 3, a wireless data transceiving system 20 of FIG. 3(A) may include one or more basic service sets (hereinafter, referred to as 'BSSs') 21 and 25. The BSS is a set of access points (hereinafter, APs) and stations (hereinafter, STAs) that can successfully synchronize and communicate with each other and is not a concept indicating a specific region.

For example, the first BSS 21 may include a first AP 22 and one first STA 21-1. The second BSS 25 may include a second AP 26 and one or more STAs 25-1 and 25-2. Herein, the first AP 22 may correspond to the communication circuit 1140 of FIG. 2, and the one or more STAs 25-1 and 25-2 may correspond to the communication circuit 1210 of FIG. 2.

The infrastructure BSSs 21 and 25 may include at least one STA, the APs 22 and 26 providing a distribution service, and a distribution system 27 for connecting the plurality of APs.

The distribution system 27 may connect the plurality of BSSs 22 and 26 to implement an extended service set (hereinafter, 'ESS') 28. The ESS 28 may be used as a term indicating one network to which the one or more APs 22 and 26 are connected through the distribution system 27. At least one AP included in one ESS 28 may have the same service set identification (hereinafter, SSID).

A portal 29 may serve as a bridge for connecting the WLAN network (IEEE 802.11) with another network (e.g., 802.X).

In a WLAN having a structure as shown in FIG. 3(A), a network between the APs 22 and 26 and a network between the APs 22 and 26 and the STAs 21-1, 25-1, and 25-2 may be implemented.

Meanwhile, a wireless data transceiving system 30 of FIG. 3(B) may perform communication by setting a network between STAs without the APs 22 and 26, unlike FIG. 3(A). A network that performs communication by setting a network even between STAs without the APs 22 and 26 is defined to an ad-hoc network or an independent basic service set (hereinafter, 'BSS').

Referring to FIG. 3(B), the wireless data transceiving system 30 is a BSS that operates in an Ad-Hoc mode, i.e., IBSS. Since the IBSS does not include an AP, there is no centralized management entity. Therefore, in the wireless data transceiving system 30, STAs 31-1, 31-2, 31-3, 32-4, and 32-5 are managed in a distributed manner. Herein, the STAs 31-1, 31-2, 31-3, 32-4, and 32-5 may correspond to the communication circuit 1140 or communication circuit 1210 of FIG. 2.

All of the STAs 31-1, 31-2, 31-3, 32-4, and 32-5 of the IBSS may be configured with mobile STAs, and access to a distributed system is not allowed. All STAs of the IBSS form a self-contained network.

The STA described in the present specification is a random function medium including a medium access control (hereinafter, MAC) following a standard of the institute of electrical and electronics engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

Figure 4:
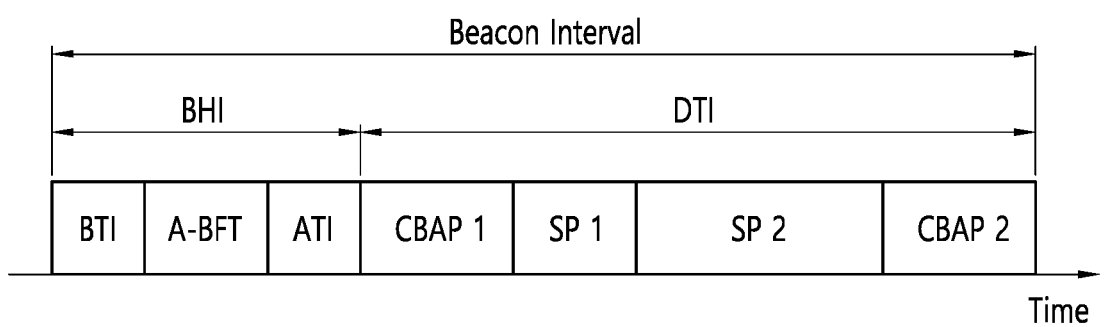
FIG. 4 is a diagram for describing a configuration of a beacon interval according to an embodiment.

FIG. 4 is a diagram for describing a configuration of a beacon interval according to an embodiment.

Referring to FIG. 4, in an enhanced directional multi-gigabit (EDMG) system, a time of media may be divided into beacon intervals. Sub-periods within the beacon interval may be referred to as an access period. Different access periods within one beacon interval may have different access rules. Information on the access period may be transmitted by an AP or a personal basic service set control point (PCP) to a non-AP STA or a non-PCP.

One beacon interval may include one beacon header interval (BHI) and one data transfer interval (DTI). As shown in FIG. 4, the BHI may include a beacon transmission interval (BTI), an association beamforming training (A-BFT), and an announcement transmission interval (ATI).

The BTI refers to a period in which one or more EDMG beacon frames can be transmitted. The A-BFT refers to a period in which beamforming training is performed by an STA which has transmitted the EDMG beacon frame during a preceding BTI. The ATI refers to a management access period based on request-response between the PCP/AP and the non-PCP/non-AP STA.

Meanwhile, a data transfer interval (DTI) is a period in which frame exchange is performed between STAs. One or more contention based access periods (CBAPs) and one or more service periods (SPs) may be allocated as shown in FIG. 4. Although an example in which 2 CBAPs and 2 SPs are allocated is shown in FIG. 4, this is for exemplary purposes only, and the disclosure is not necessarily limited thereto.

Hereinafter, a physical layer configuration for data communication in a wireless AV system to which the present disclosure is applied will be described in detail.

Figure 5:
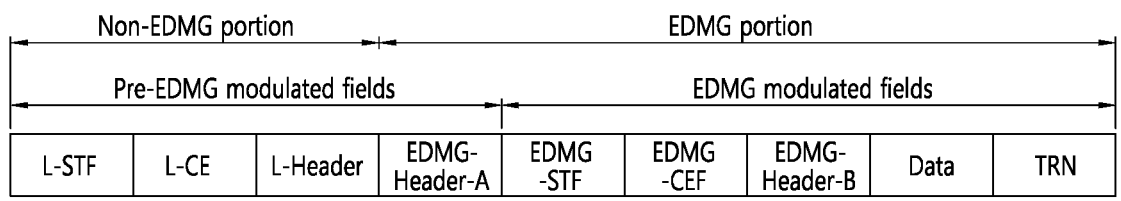
FIG. 5 is a diagram briefly illustrating a configuration of a physical protocol data unit (PPDU) frame according to an embodiment.

FIG. 5 is a diagram briefly illustrating a configuration of a physical protocol data unit (PPDU) frame according to an embodiment.

Referring to FIG. 5, the PPDU frame may include a legacy-short training field (L-STF), a legacy-channel estimated field (L-CEF), a legacy-header (L-header), an enhanced directional multi-gigabit-header A (EDMG-header A), an EDMG-STF, an DMG-CEF, an EDMG-header B, data, and TRN. These fields may be selectively included according to a PPDU type (e.g., SU PPDU, MU PPDU, etc.). The L-STF includes a training signal. The L-header may include control information for a first legacy station (e.g., a station supporting IEEE802.11ad). The EDMG-header may include control information for a second legacy station (e.g., a station supporting IEEE802.11ay). The EDMG-STF may include a training signal for the second legacy station.

Herein, control information fields (L-STF, L-CEF, L-header, EDMG header A, EDMG-STF, EDMG-CEF, EDMG-header B) of a physical layer added to a front end of data may be collectively referred to as a preamble. In addition, a part including the L-STF, L-CEF, and L-header fields may be referred to as a non-EDMG region, and the remaining parts may be referred to as an EDMG region. In addition, the L-STF, L-CEF, L-Header, and EDMG-Header-A fields may be referred to as pre-EDMG modulated fields, and the remaining parts may be referred to as EDMG modulated fields.

Returning to FIG. 2, a MIMO channel 11 may be constructed between the plurality of antennas 1150-1, 1150-2, . . . , 1150-$N_{Tx}$ and the plurality of antennas 1250-1, 1250-2, . . . , 1250-$N_{Rx}$, and data may be transmitted/received through the MIMO channel 11. Herein, each antenna may be referred to as a DMG antenna or an EDMG antenna.

Hereinafter, several assumptions may be premised to implement the present disclosure.

For example, each antenna may operate in connection with an individual RF chain.

As another example, reciprocity between antennas may not be considered.

As another example, an SLS during a BHI may be performed using only one main antenna. This is to reduce a BHI overhead. In this case, a control link may be configured in the main antenna. A BRP packet may be transmitted using one main antenna, and in this case, transmission of the TRN may be omitted. However, any packet may be received in a receiving end by using a plurality of antennas.

As another example, regarding a transmit sector sweep (TXSS), it is assumed that an antenna weight vector (AWV) or main lobe of an antenna does not affect an AWW or main beam of another antenna. For example, in the case of simultaneous transmission in two antennas using an orthogonal TBN sequence, since a transmitting end and a receiving end (or PCP, STA) may calculate inter-stream interference by using the orthogonal TRN sequence, there is no need to sweep the entire Tx sector combination N×N (where N is the total number of sectors of a single DMG antenna). In addition, each antenna changes the AWV independently and sequentially. That is, the total number of Tx sectors to be trained may be reduced only to N.

As another example, regarding a receive sector sweep (RXSS), the RXSS has an opportunity to reduce an overhead of SU-MIMO beamforming training. Similarly to the TXSS, the RXSS may also require both an initiator link and a responder link. I-MID and R-MID may be modified and reused.

The communication circuits 1140 and 1210 constitute the MIMO channel 11, and the wireless data transmitting device 1100 and the wireless data receiving device 1200 transmit and receive data through the MIMO channel 11. The communication circuits 1140 and 1210 may perform beamforming (BF) or BF training for MIMO, based on the plurality of antennas 1150-1, 1150-2, . . . , 1150-$N_{Tx}$, 1250-1, 1250-2, . . . , 1250-$N_{Rx}$. The beamforming training is for providing necessary signaling to each STA to determine an antenna system setting appropriate for transmission of a BF training frame using a sector sweep.

For example, in order to perform beamforming for MIMO, the communication circuits 1140 and 1210 may sequentially perform an SLS phase, a SISO phase, and a MIMO phase.

The SLS phase includes determining an approximate transmission direction using a relatively wide beam. The SISO phase performs an SLS for each DMG antenna using a sector sweep (SSW) frame, a short SSW frame, or a BRP TXSS, and provides information for selecting a candidate group for a TX sector to be trained in the MIMO phase or a TX sector combination. In addition, the MIMO phase includes a procedure in which a Tx sector combination and an Rx sector combination corresponding thereto are trained using a BRP frame having a TRN to obtain a sector combination of an optimal Tx-Rx pair for MIMO transmission.

As another example, in order to perform beamforming for MIMO, the communication circuits 1140 and 1210 may perform the MIMO phase immediately after completing the SLS phase. In this case, since the SISO phase is omitted, a time required for the BRP TXSS may be reduced.

Figure 6:
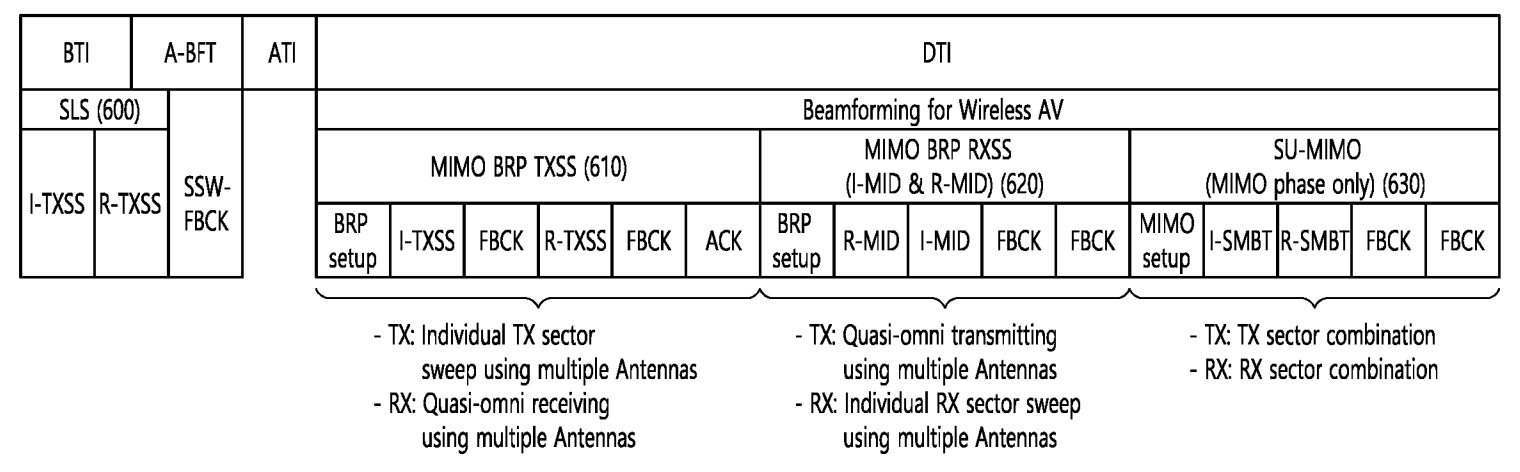

FIG. 6 shows a beamforming training process according to an embodiment. The process corresponds to an operation of the communication circuits 1140 and 1210. Hereinafter, an STA which intends to transmit data through a beamforming operation is referred to as an initiator, and an STA which receives data from the initiator is referred to as a responder. In addition, a link from the initiator to the responder is referred to as an initiator link, and a link from the responder to the initiator is referred to as a responder link.

Referring to FIG. 6, the BF training process includes a sector level sweep (SLS) phase 600 for selecting a coarse beam on a sector basis and beam refinement protocol (BRP) phases 610 and 620 for selecting a fine beam. That is, the BF training starts with the SLS from an initiator.

The purpose of the SLS phase 600 is to enable communication between two STAs at a control PHY rate or a higher MCS. In particular, the SLS phase 600 only provides transmitting of the BF training. In the SLS phase 600, an approximate transmission direction is determined using a relatively wide beam. In this phase, a relatively small number of antenna elements may be used. Herein, a transmitting end may operate in a beamforming mode (a directional antenna mode), and a receiving end may operate in a quasi-omni antenna mode. The receiving end may receive a specific signal (e.g., a preamble) transmitted by the transmitting end while sweeping a beam, and thus may estimate a Tx beam of the transmitting end. Therefore, STAs which intent to transmit/receive data may know Tx or Rx best sector for the initiator and responder through the SLS phase 600.

In this case, as a protocol for performing link detection in a wireless AV system to which the present discloser is applicable, the SLS phase 600 may be a beam training scheme in which network nodes continuously transmit/receive a frame including capability information of an Rx channel link while changing only a beam direction, and select a best beam direction having a best index (e.g., a signal to ratio (SNR), a received signal strength indicator (RSSI), etc.) indicating an optimal frame among frames successfully received.

The SLS phase 600 will be described in greater detail. The SLS phase 600 may include an initiator TX sector sweep (I-TXSS) for training an initiator link, a responder TX sector sweep (R-TXSS) for training a responder link, an SSW feedback (FBCK), and an SSW ACK.

In this case, the initiator may start the SLS phase 600 by transmitting frame(s) of the I-TXSS. The responder does not start transmission of frame(s) of the R-TXSS before the I-TXSS is successfully complete. However, a case where the I-TXSS occurs within a BTI may be exceptional. The initiator may not start the SSW FBCK before the R-TXSS phase is successfully complete. However, a case where the R-TXSS occurs within an A-BFT may be exceptional. The responder does not start the SSW ACK of the initiator within the A-BFT. The responder may start the SSW ACK of the initiator immediately after the SSW FBCK of the initiator is successfully complete.

During the SLS phase 600, an FB frame transmitted by the initiator may include an (EDMG) beacon frame, an SSW frame, and an SSW FBCK frame. During the SLS phase, the BF frame transmitted by the responder may include an SSW frame and an SSW-ACK frame.

When each of the initiator and the responder performs the TXSS during the SLS phase 600, the initiator and the responder possess their own Tx sectors at the end of the SLS phase 600. If the I-TXSS or the R-TXSS employs a receive sector sweep, the responder or the initiator possesses its own Rx sector. The STA does not change transmit power during the sector sweep.

In this case, for example, in the aforementioned SLS phase 600, the initiator and the responder may use a short SSW frame, and for this, it may be necessary to define the SSW FBCK frame and the SSW ACK frame.

When there is a request from the initiator or the responder, a beam refinement protocol (BRP) phase or a beam refinement phase may be performed subsequent to the SLS phase 600.

The purpose of the BRP phase is to enable reception training and to enable iterative refinement of an antenna weight vector (AVW) of all transmitters and receivers in all STAs. If one of the STAs participating in the beam training chooses to use only one transmit antenna pattern, the reception training may be performed as part of the SLS phase 600.

In the BRP phase, a Tx/Rx beam combination is determined precisely by using a relatively narrow beam. The BRP phase may include a SISO phase and a MIMO phase. The BRP phase may use a relatively great number of antenna elements compared to the SLS phase 600, and may increase precision through iterative execution.

As described above, the SISO phase may be performed as a preliminary phase to reduce an overhead of the MIMO phase, and thus the SISO phase may be selectively included in the BRP phase. When the SISO phase is omitted, the BRP phase may be identified with the MIMO phase, and in this case, the BRP phase may be referred to as a MIMO phase. In the BRP phase, a state in which minimal communication is possible such as transmission of a control packet, a beacon, or the like, and an optimal beam between the transmitting end and the receiving end is determined.

In the present embodiment, the BRP phase or MIMO phase in which the SISO phase is omitted is initiated.

The BRP TXSS according to the present embodiment may include at least one of a MIMO BRP TXSS 610, a MIMO BRP RXSS 620, and an SU-MIMO phase 630. That is, the BRP phase or MIMO phase according to the present embodiment may include at least one of the MIMO BRP TXSS 610 as a first sub-phase, the MIMO BRP RXSS 620 as a second sub-phase, and the SU-MIMO phase 630 as a third sub-phase.

The MIMO BRP TXSS 610 includes an operation in which the wireless data transmitting device 1100 performs Tx sector training by sweeping or transmitting a sector independently and in parallel for each transmit antenna without having to perform the MIMO BRP TXSS 610 for all Tx sector combinations for a plurality of transmit antennas. In addition, the wireless data transmitting device 1100 obtains a Tx sector candidate per antenna. Accordingly, it is possible to reduce a time of the BRP TXSS (the SISO phase in MIMO BF).

The MIMO BRP RXSS 620 may provide information for selecting a candidate group of an Rx sector combination for performing the MIMO phase. In addition, accordingly, a time of the MIMO phase may be reduced. Similarly to the MIMO BPR TXSS 610, the MIMO BRP RXSS 620 may include a phase in which the Rx sector training is performed independently and in parallel for each receive antenna. In addition, an Rx sector candidate per antenna may be derived through the MIMO BRP RXSS 620.

The SU-MIMO phase 630 includes a phase of deriving a best Tx-Rx sector combination among all Tx-Rx sector combinations.

In a 60 GHz band supported by the wireless AV system to which the present disclosure is applicable, not an omni transmission scheme but a directional transmission scheme may be applied to more reliably transfer data, control information, or the like.

Hereinafter, an embodiment for each phase will be described in greater detail. First, the MIMO BRP TXSS 610 will be described.

Figure 7:
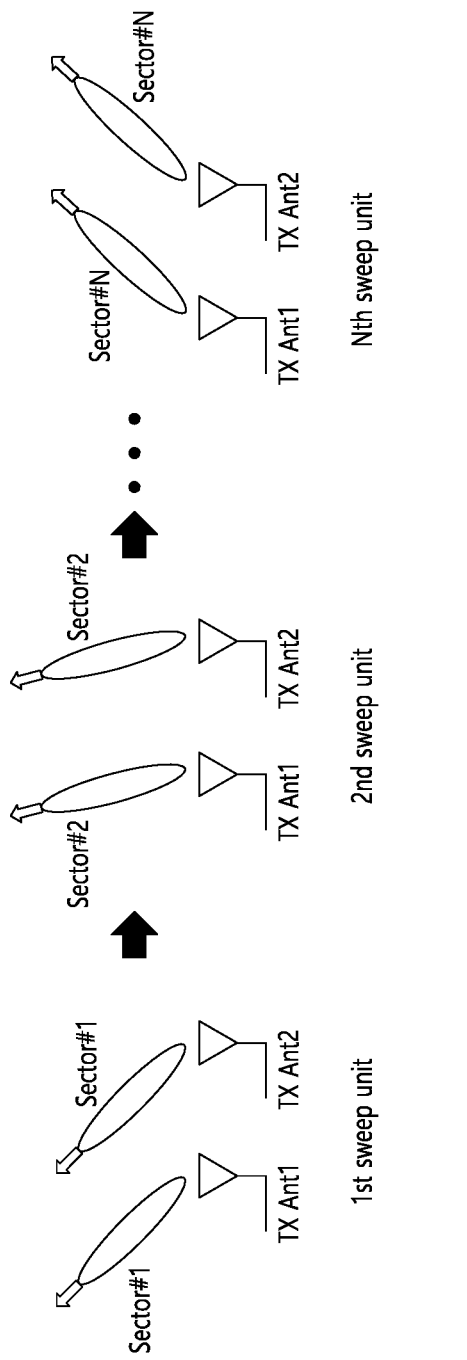
FIG. 7 shows a beamforming training process according to an embodiment, which corresponds to a MIMO phase.

FIG. 7 shows a beamforming training process according to an embodiment. Herein, an antenna used in beamforming training may be the plurality of antennas 1150-1, 1150-2, . . . , 1150-$N_{Tx}$, 1250-1, 1250-2, . . . , 1250-$N_{Rx}$ provided in the wireless data transmitting device 1100 and wireless data receiving device 1200 based on FIG. 2. However, for convenience of explanation, in the following embodiment, it is assumed that two antennas are provided in each of the wireless data transmitting device 1100 and the wireless data receiving device 1200 ($N_{Tx}$=2, $N_{Rx}$=2). That is, the wireless data transmitting device 1100 may include two transmit antennas, i.e., a Tx Ant1 and a Tx Ant2, and the wireless data receiving device 1200 may include two receive antennas, i.e., an Rx Ant1 and an Rx Ant2. Meanwhile, the wireless data transmitting device 1100 and the wireless data receiving device 1200 may be initiators or responders, and it is related such that, if any one of them is an initiator, the other one is a responder.

Referring to FIG. 7, the MIMO BRP TXSS 610 derives or obtains k Tx sector candidates for each transmit antennas, based on an individual Tx sector sweep.

Herein, the individual Tx sector sweep is to derive K candidate Tx sectors for each transmit antenna while performing a sector sweep individually for each transmit antenna. That is, the individual Tx sector sweep includes performing of Tx sector training or beamforming training by sweeping or transmitting a sector individually or in parallel for each transmit antenna, instead of performing Tx sector training or beamforming training for all Tx sector combinations for a plurality of transmit antennas. The individual Tx sector sweep may also be referred to as a parallel Tx sector sweep.

As an example, the individual Tx sector sweep includes a scheme of sweeping the entire sector for each transmit antenna, while sweeping a new sector by sequentially changing a sector every sweep unit. In this case, all transmit antennas may collectively change the sector every sweep unit. For example, as shown in FIG. 7, each of the Tx Ant1 and the Tx Ant2 performs a sector sweep in a sector #1 in a first sweep unit, and collectively performs a sector sweep in a new sector, i.e., a sector #2, in a second sweep unit. As such, an operation in which each transmit antenna performs a new sector sweep while sequentially changing a sector collectively every sweep unit is referred to as an individual Tx sector sweep. When the total number of sectors is N, the Tx Ant1 and the Tx Ant2 eventually perform a sector sweep for a sector #N.

According to the individual Tx sector sweep, a sector sweep result is derived N times in total for each transmit antenna, and K candidates of Tx sector per DMG antenna are derived.

In this case, a TRN field used in the sector sweep includes two orthogonal sequences or waveforms. In addition, all (2) receive antennas, i.e., the Rx Ant1 and the Rx Ant2, receive the TRN field constructed of two orthogonal signals from the Tx Ant1 and the Tx Ant2 in a quasi-omni reception mode. In this case, the number Nmeas of measurement values obtained by the wireless data receiving device 1200 is 2K. However, since this is a case where the number of transmit antennas is 2, if this is generalized to a case where $N_{Tx}$ denotes the transmit antenna, the number Nmeas of the measurement values obtained by the wireless data receiving device 1200 is $K*N_{Tx}$. Therefore, it can be seen that the MIMO beamforming according to the present embodiment is significantly reduced compared to the number $K*K^{NTx}*N_{Rx}$ of measurement values for a case where an Rx sector combination of all transmit antennas and receive antennas shall be measured. Accordingly, a time required for MIMO beamforming may be significantly reduced.

FIG. 7 is characterized in that, in the individual Tx sector sweep, the order of sectors to be swept is identical for each transmit antenna (i.e., all antennas are swept in the order of the sector #1→the sector #2, ... →the sector #N). However, this is for exemplary purposes only, and the order of sectors to be swept may differ for each transmit antenna. This is the same as shown in FIG. 8.

Figure 8:
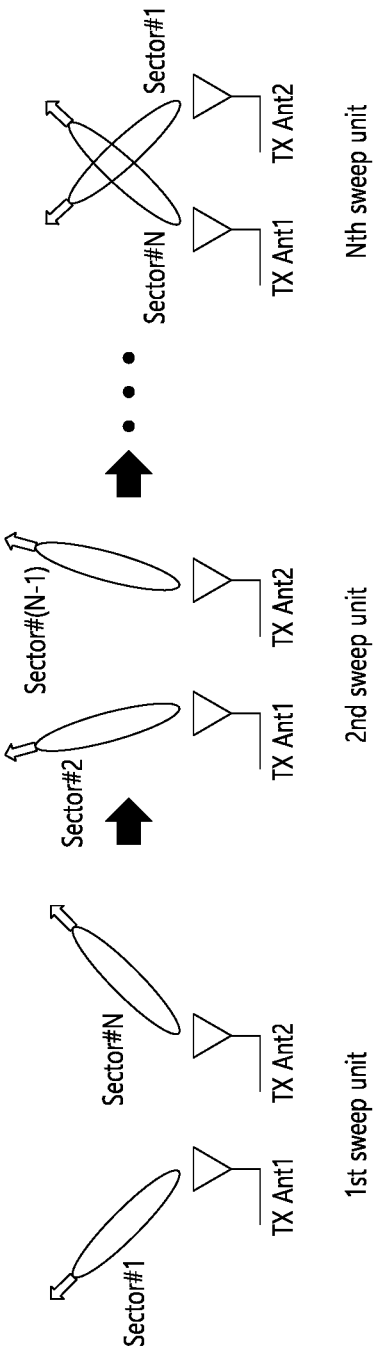
FIG. 8 shows a data communication method based on a beamforming training process according to an embodiment.

FIG. 8 shows a beamforming training process according to another embodiment.

Referring to FIG. 8, in an individual Tx sector sweep, the order of sectors to be swept may progress backwards in each transmit antenna.

For example, in a first sweep unit, a Tx Ant1 performs a sector sweep in a sector #1, and a Tx Ant 2 performs the sector sweep in a sector #N. In a second sweep unit, the Tx Ant1 performs the sector sweep in a next sector, i.e., the sector #2, and the Tx Ant2 performs the sector sweep in a next sector, i.e., a sector #N−1. That is, the Tx Ant1 may perform the sector sweep in the order of the sector #1→the sector #2, ... →the sector #N, whereas the Tx Ant 2 may perform the sector sweep in the order of the sector #N→the sector #N−1→ ... →the sector #2→the sector #1.

As such, each transmit antenna may start the sector sweep at both different end sectors, and may perform a new sector sweep while sequentially changing a sector simultaneously every sweep unit.

Figure 9:
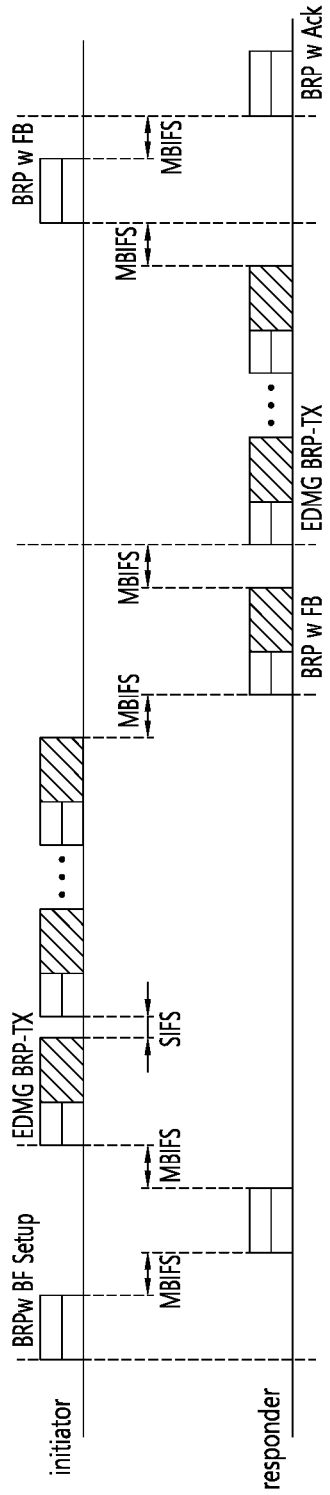
FIG. 9 shows a data communication method based on a beamforming training process according to another embodiment.

FIG. 9 shows PPDU frames exchanged between an initiator and a responder in a beamforming training process according to an embodiment of FIG. 6 to FIG. 8.

In the embodiment of FIG. 9, when the initiator is the wireless data transmitting device 1100 and the responder is the wireless data receiving device 1200, an operation of a MAC layer and physical layer of the initiator may be performed by the communication circuit 1140 of the wireless data transmitting device 1100, and an operation of a MAC layer and physical layer of the responder may be performed by the communication circuit 1210 of the wireless data receiving device 1200. On the other hand, in the embodiment of FIG. 9, when the initiator is the wireless data receiving device 1200 and the responder is the wireless data transmitting device 1100, the operation of the MAC layer and physical layer of the initiator may be performed by the communication circuit 1210 of the wireless data receiving device 1200, and the operation of the MAC layer and physical layer of the responder may be performed by the communication circuit 1140 of the wireless data transmitting device 1100.

Hereinafter, the MIMO BRP RXSS 620 will be described in greater detail.

Figure 10:
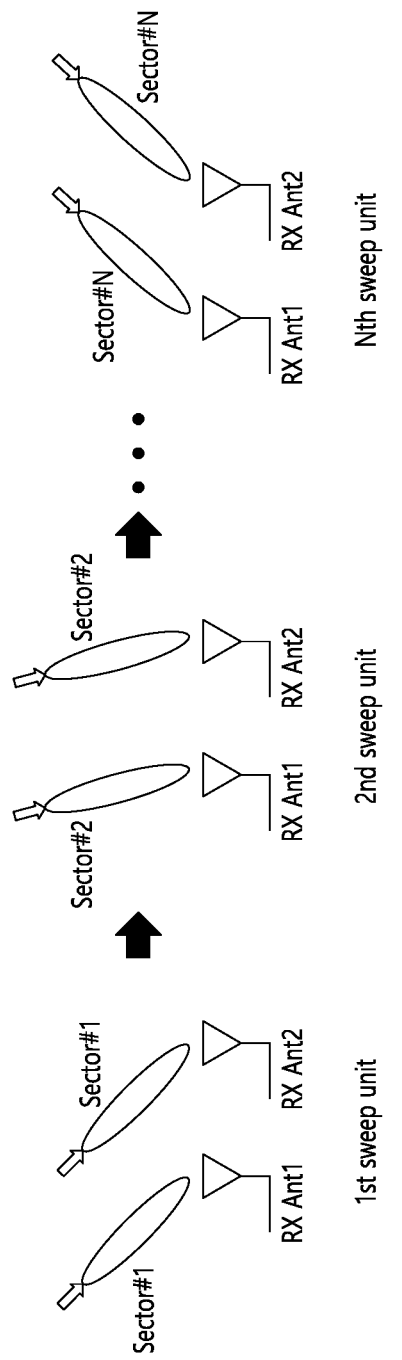
FIG. 10 shows a data communication method based on a beamforming training process according to another embodiment.

FIG. 10 shows a beamforming training process according to another embodiment. Herein, an antenna used in beamforming training may be the plurality of antennas 1150-1, 1150-2, ..., 1150-$N_{Tx}$, 1250-1, 1250-2, ..., 1250-$N_{Rx}$ provided in the wireless data transmitting device 1100 and wireless data receiving device 1200 based on FIG. 2. However, in FIG. 10, for convenience of explanation, in the following embodiment, it is assumed that two antennas are provided in each of the wireless data transmitting device 1100 and the wireless data receiving device 1200 ($N_{Tx}$=2, $N_{Rx}$=2). That is, the wireless data transmitting device 1100 may include two transmit antennas, i.e., a Tx Ant1 and a Tx Ant2, and the wireless data receiving device 1200 may include two receive antennas, i.e., an Rx Ant1 and an Rx Ant2.

Referring to FIG. 10, the MIMO BRP RXSS 620 derives or obtains J Rx sector candidates for each receive antennas, based on an individual Rx sector sweep.

Herein, the individual Rx sector sweep is to derive J candidate Rx sectors for each receive antenna while performing a sector sweep individually for each receive antenna. The individual Rx sector sweep may also be referred to as a parallel Rx sector sweep.

As an example, the individual Rx sector sweep includes a scheme of sweeping the entire sector for each receive antenna, while each receive antenna sweeps a new sector collectively (or sequentially) every sweep unit. For example, as shown in FIG. 10, the Rx Ant1 and the Rx Ant2 individually perform a sector sweep in a sector #1 in a first sweep unit, and individually perform the sector sweep in a next sector, i.e., a sector #2, in a second sweep unit. As such, an operation in which each receive antenna performs a new sector sweep while sequentially changing a sector simultaneously every sweep unit is referred to as an individual Rx sector sweep. When the total number of sectors is N, the Rx Ant1 and the Rx Ant2 eventually perform a sector sweep for a sector N.

According to the individual Rx sector sweep, a sector sweep result is derived N times in total for each receive antenna, and J candidates of Rx sector per DMG antenna are derived.

In this case, a TRN field used in the sector sweep does not have to include an orthogonal sequence or waveform. In addition, the transmit antennas, i.e., the Tx Ant1 and the Tx Ant 2, receive the TRN field from the Rx Ant 1 and the Rx Ant 2 in a quasi-omni reception mode. In this case, the number Nmeas of measurement values obtained by the wireless data transmitting device 1100 is 2J. However, since this is a case where the number of receive antennas is 2, if this is generalized to a case where $N_{Rx}$ denotes the receive antenna, the number Nmeas of the measurement values obtained by the wireless data transmitting device 1100 is $J*N_{Rx}$. Therefore, it can be seen that the MIMO beamforming according to the present embodiment is significantly reduced compared to the number $J*J^{NTx}*N_{Rx}$ of measurement values for a case where an Rx sector combination of all transmit antennas and receive antennas shall be measured. Accordingly, a time required for MIMO beamforming may be significantly reduced.

FIG. 10 is characterized in that, in the individual Rx sector sweep, the order of sectors to be swept is identical for each receive antenna (i.e., all antennas are swept in the order of the sector #1→the sector #2, ... →the sector #N). However, this is for exemplary purposes only, and the order of sectors to be swept may differ for each transmit antenna. This is the same as shown in FIG. 11.

Figure 11:
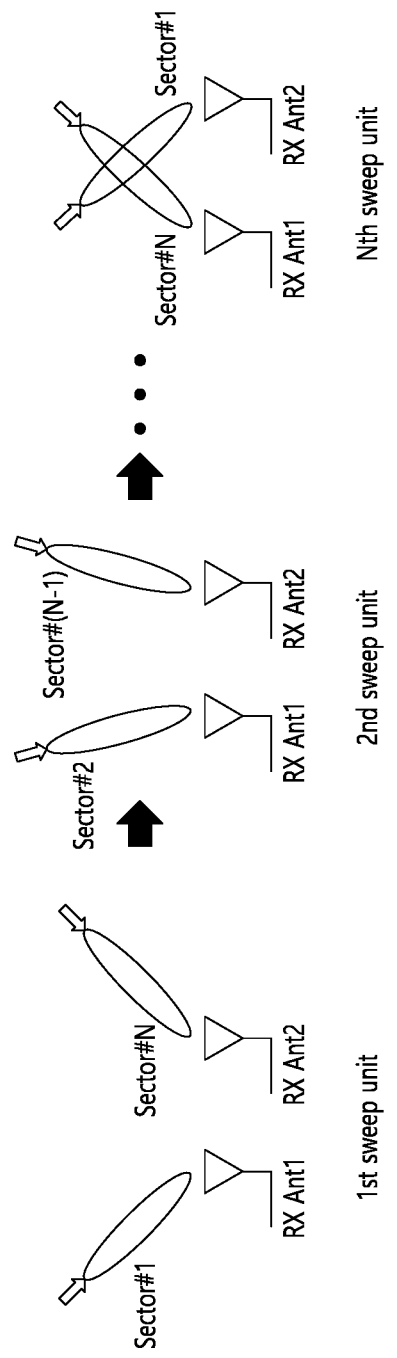
FIG. 11 shows a beamforming training process according to another embodiment.

FIG. 11 shows a beamforming training process according to another embodiment.

Referring to FIG. 11, in an individual Rx sector sweep, the order of sectors to be swept may progress backwards in each receive antenna. For example, in a first sweep unit, an Rx Ant1 performs a sector sweep in a sector #1, and an Rx Ant 2 performs the sector sweep in a sector N. In a second sweep unit, the Rx Ant1 performs the sector sweep in a next sector, i.e., the sector #2, and the Rx Ant2 performs the sector sweep in a next sector, i.e., a sector #N−1.

That is, the Rx Ant1 may perform the sector sweep in the order of the sector #1→the sector #2, . . . →the sector #N, whereas the Rx Ant 2 may perform the sector sweep in the order of the sector #N→the sector #N−1→ . . . →the sector #2→the sector #1.

As such, each receive antenna may start the sector sweep at both different end sectors, and may perform a new sector sweep while sequentially changing a sector simultaneously every sweep unit.

Figure 12:
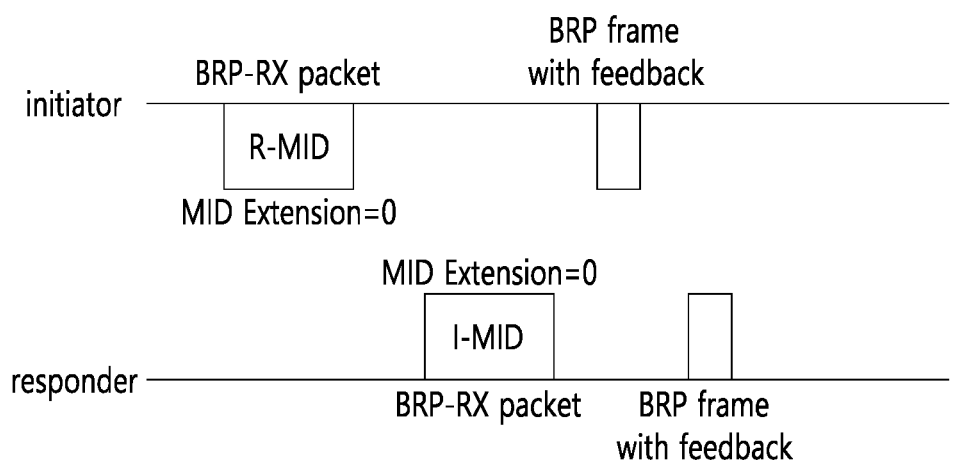
FIG. 12 shows PPDU frames exchanged between an initiator and a responder in a beamforming training process according to an embodiment of FIG. 10 to FIG. 11.

FIG. 12 shows PPDU frames exchanged between an initiator and a responder in a beamforming training process according to an embodiment of FIG. 10 to FIG. 11.

According to the present embodiment, a time separation between the BRP frame exchanges is MBIFS, which may be greater than or equal to SIFS and less than or equal to BRPIFS.

In the embodiment of FIG. 12, when the initiator is the wireless data transmitting device 1100 and the responder is the wireless data receiving device 1200, an operation of a MAC layer and physical layer of the initiator may be performed by the communication circuit 1140 of the wireless data transmitting device 1100, and an operation of a MAC layer and physical layer of the responder may be performed by the communication circuit 1210 of the wireless data receiving device 1200. On the other hand, in the embodiment of FIG. 12, when the initiator is the wireless data receiving device 1200 and the responder is the wireless data transmitting device 1100, the operation of the MAC layer and physical layer of the initiator may be performed by the communication circuit 1210 of the wireless data receiving device 1200, and the operation of the MAC layer and physical layer of the responder may be performed by the communication circuit 1140 of the wireless data transmitting device 1100.

Hereinafter, the SU-MIMO beamforming 630 will be described in greater detail.

The SU-MIMO beamforming 630 may derive an optimal Tx-Rx sector combination by combining K candidate Tx sectors derived by the MIMO BRP TXSS 610 and J candidate Rx sectors derived by the MIMO BRP RXSS 620. When the K candidate Tx sectors and the J candidate Rx sectors are combined, the total number of combinations to be derived may be $K^2*J^2$, and an optimal Tx-Rx sector combination among them is selected by the SU-MIMO beamforming 630. In this case, the total number of measurement values included in a feedback element is defined by a Tx sector combination $N_{tsc}*N_{Tx}$.

Figure 13:
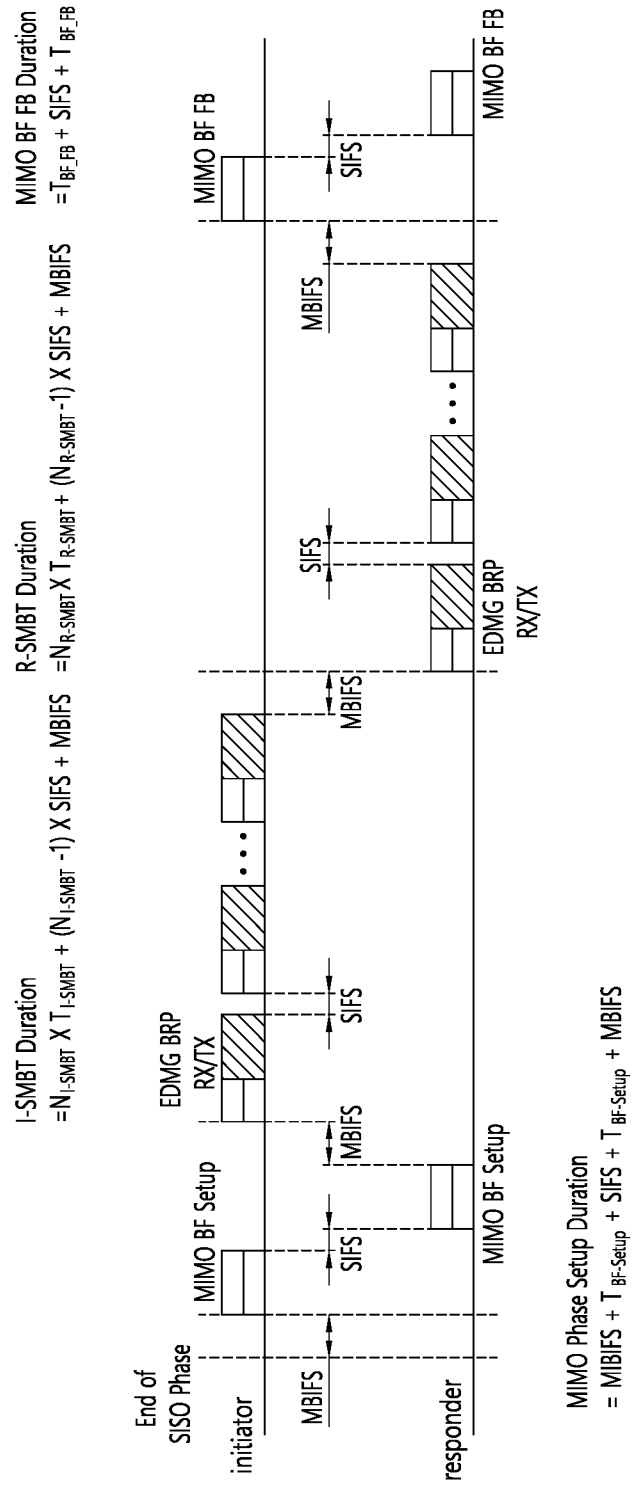
FIG. 13 shows PPDU frames exchanged between an initiator and a responder in a beamforming training process according to another embodiment.

FIG. 13 shows PPDU frames exchanged between an initiator and a responder in a beamforming training process according to another embodiment.

In the embodiment of FIG. 13, when the initiator is the wireless data transmitting device 1100 and the responder is the wireless data receiving device 1200, an operation of a MAC layer and physical layer of the initiator may be performed by the communication circuit 1140 of the wireless data transmitting device 1100, and an operation of a MAC layer and physical layer of the responder may be performed by the communication circuit 1210 of the wireless data receiving device 1200. On the other hand, in the embodiment of FIG. 13, when the initiator is the wireless data receiving device 1200 and the responder is the wireless data transmitting device 1100, the operation of the MAC layer and physical layer of the initiator may be performed by the communication circuit 1210 of the wireless data receiving device 1200, and the operation of the MAC layer and physical layer of the responder may be performed by the communication circuit 1140 of the wireless data transmitting device 1100.

FIG. 14 shows a data communication method based on a beamforming training process according to an embodiment.

Referring to FIG. 14, when an initiator and a responder both complete a beamforming training process during a data transmission interval (DTI) within a beacon interval (BI) (S1400), each of the initiator and the responder may store a result of beamforming training, and may enter a MIMO channel access phase.

The MIMO beamforming training result may be expressed as an optimal Tx-Rx sector combination in a current communication environment. In this case, the initiator and the responder may estimate or determine performance of each Tx-Rx sector combination in the current communication environment, based on the beamforming training, and may store a result of estimation or determination. In addition, the initiator and the responder may determine which Tx-Rx sector combination is suitable for transmission of a data frame in the current communication environment, based on the beamforming training.

When the data frame is transmitted using MIMO, the initiator first transmits, to the responder, information on which Tx-Rx sector combination index will be used in transmission (i.e., information on a Tx-Rx sector combination index) among a plurality of Tx-Rx sector combinations that can be supported by the initiator.

The initiator (or TXOP holder) transmits a data frame or the like, based on the optimal Tx-Rx sector combination calculated from a MIMO beamforming training result (S1405). In addition, the responder also transmits the data frame or the like, based on the optimal Tx-Rx sector combination calculated from the MIMO beamforming training result (S1410).

In the embodiment for FIG. 14, when the initiator is the wireless data transmitting device 1100 and the responder is the wireless data receiving device 1200, an operation of the initiator may be performed by the communication circuit 1140 of the wireless data transmitting device 1100, and an operation of the responder may be performed by the communication circuit 1210 of the wireless data receiving device 1200. On the other hand, in the embodiment for FIG. 14, when the initiator is the wireless data receiving device 1200 and the responder is the wireless data transmitting device 1100, the operation of the initiator may be performed by the communication circuit 1210 of the wireless data receiving device 1200, and the operation of the responder may be performed by the communication circuit 1140 of the wireless data transmitting device 1100.

Since not all components or steps are essential in the aforementioned wireless data receiving device and method or transmitting device and method, the wireless data receiving device and method or transmitting device and method may be performed by including some or all of the aforementioned components or steps. In addition, embodiments of the aforementioned wireless data receiving device and method or transmitting device and method may be performed in combination with each other. In addition, each of the aforementioned components or steps does not necessarily have to be performed in the order described above, and it is also possible that steps described later are performed prior to steps described earlier.

While the present disclosure has been particularly shown and described with reference to exemplary embodiments thereof, it will be understood by those skilled in the art that various changes in form and details may be made therein without departing from the spirit and scope of the disclosure as defined by the appended claims. Therefore, embodiments of the present disclosure described above can be implemented separately or in combination with each other.

What is claimed is:

1. A wireless data transmitting device in a wireless audio/video (AV) system, the device comprising:
   a plurality of transmit antennas;
   a communication circuit which performs a multiple input multiple output (MIMO) beamforming procedure based on an individual transmit (Tx) sector sweep for each of the plurality of transmit antennas during a data transmission interval (DTI) within a beacon interval (BI), and transmits a physical layer protocol data unit (PPDU) frame to a wireless data receiving device through the plurality of transmit antennas; and
   a processor coupled with the communication circuit and configured to generate AV data to be transmitted through the PPDU frame and provide the AV data to the communication circuit,
   wherein the MIMO beamforming procedure includes an individual receive (Rx) sector sweep for each of a plurality of receive antennas included in the wireless data receiving device,
   wherein the communication circuit derives K candidate Tx sectors for each of the transmit antennas as a result of the individual Tx sector sweep, and derives J candidate Rx sectors for each of the receive antennas as a result of the individual Rx sector sweep,
   wherein the MIMO beamforming procedure further includes a single user (SU)-MIMO procedure, and
   wherein the SU-MIMO procedure determines an optimal Tx-Rx sector combination from the K candidate Tx sectors and the J candidate Rx sectors.

2. The device of claim 1, wherein the individual Tx sector sweep includes sweeping performed by each of the plurality of transmit antennas for a new sector while changing a sector sequentially every sweep unit.

3. The device of claim 1, wherein the wireless data receiving device operates in a quasi-omni antenna mode during the MIMO beamforming procedure is performed.

4. The device of claim 1, wherein the plurality of transmit antennas operate in a quasi-omni antenna mode during which the individual Rx sector sweep is performed.

5. The device of claim 1, wherein the communication circuit transmits the PPDU frame, based on the optimal Tx-Rx sector combination determined according to the MIMO beamforming procedure.

6. A wireless data receiving device in a wireless audio/video (AV) system, the device comprising:
   a plurality of receive antennas;
   a communication circuit which performs a multiple input multiple output (MIMO) beamforming procedure based on an individual receive (Rx) sector sweep for each of the plurality of receive antennas during a data transmission interval (DTI) within a beacon interval (BI), and receives a physical layer protocol data unit (PPDU) frame from a wireless data transmitting device through the plurality of receive antennas; and
   a processor coupled with the communication circuit and configured to restore AV data included in the PPDU frame,
   wherein the MIMO beamforming procedure includes an individual transmit (Tx) sector sweep for each of a plurality of transmit antennas included in the wireless data transmitting device,
   wherein the communication circuit derives J candidate Rx sectors for each of the receive antennas as a result of the individual Rx sector sweep, and derives K candidate Tx sectors for each of the transmit antennas as a result of the individual Tx sector sweep,
   wherein the MIMO beamforming procedure further includes a single user (SU)-MIMO procedure, and
   wherein the SU-MIMO procedure determines an optimal Tx-Rx sector combination from the K candidate Tx sectors and the J candidate Rx sectors.

7. The device of claim 6, wherein the individual Rx sector sweep includes sweeping performed by each of the plurality of receive antennas for a new sector while changing a sector sequentially every sweep unit.

8. The device of claim 6, wherein the wireless data transmitting device operates in a quasi-omni antenna mode during the MIMO beamforming procedure is performed.

9. The device of claim 6, wherein the plurality of receive antennas operate in a quasi-omni antenna mode during which the individual Tx sector sweep is performed.

10. The device of claim 6, wherein the communication circuit receives the PPDU frame, based on the optimal Tx-Rx sector combination determined according to the MIMO beamforming procedure.

* * * * *